March 10, 1964 H. J. GRAY, JR 3,124,705

SYNCHRONIZED SINGLE PULSE CIRCUIT PRODUCING OUTPUT
OF PREDETERMINED LENGTH FROM DELAY LINES
HAVING DISSIMILAR PERIODS

Filed March 24, 1961 2 Sheets-Sheet 1

INVENTOR
HARRY J. GRAY, JR.

BY G. Donald Weber, Jr
AGENT 3,124,705

SYNCHRONIZED SINGLE PULSE CIRCUIT PRODUCING OUTPUT OF PREDETERMINED LENGTH FROM DELAY LINES HAVING DISSIMILAR PERIODS

Harry J. Gray, Jr., Springfield, Pa., assignor to Sperry Rand Corporation, New York, N.Y., a corporation of Delaware Filed Mar. 24, 1961, Ser. No. 98,216
14 Claims. (Cl. 307—88.5)

This invention relates to a circuit which permits the production of a single synchronized output pulse in response to a non-synchronous input pulse.

In electronic computers, especially those of the digital type, a problem often arises with regard to the synchronization of pulses within the circuitry. That is, when information is to be introduced into the computing machine by a human operator for example, asynchronous pulses or other non-synchronous pulses, are often introduced into the computer circuitry during the transitional state between steady state conditions. These asynchronously introduced pulses must be so manipulated that information represented thereby can be properly utilized by other portions of the computer circuitry which are synchronized with each other. Thus, for example, the operator may, and usually does, operate much more slowly than does the machine. Therefore, it may be desirable to have a circuit which will allow the production of only a single output pulse in response to one input signal, regardless of its excessive length relative to the cyclic operating speed of the computing machine. Moreover, it is even more advantageous to have the single output pulse produced in synchronism with the operation of the overall machine.

In order that this single pulse synchronization may be affected, the subject circuit has been devised. Clearly, one object of this invention is to provide a circuit which provides a synchronized output pulse in response to a non-synchronous input signal.

Another object of this invention is to produce a single synchronized output signal having a fixed pulse duration of 0.5 microseconds.

Still another object of this invention is to provide a circuit which produces a single standardized output pulse from a non-synchronous input signal regardless of the excessive length of the input signal.

Yet another object of the invention is to provide a circuit configuration which is capable of converting an asynchronous input signal of any duration to a single 0.5 microsecond pulse which is synchronized with a clock pulse.

A further object of this invention is to provide a synchronizing circuit utilizing standard logic components.

A still further object of the invention is to provide a synchronizing circuit which avoids the reproduction of improper spurious input signals.

Another object of the invention is to provide a circuit which will produce an output when switched to a reset condition but will not prôduce an output when switched back to the set condition.

Another object of the invention is to simultaneously provide synchronized output signals of both positive and negative polarities.

Another object of this invention is to produce a synchronized output signal having a fixed pulse duration of a predetermined time period.

These and other objects and advantages of the invention will become more readily apparent by reviewing the following description in conjunction with the attached figures, in which.

Figure 1:
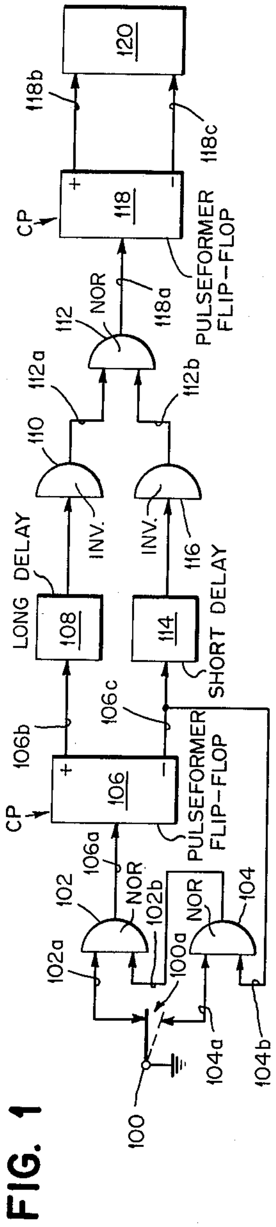
FIGURE 1 is a logical block diagram of the circuit.

Referring now to FIG. 1 the input signal to the circuit is supplied by any suitable source. For purposes of description, this source is represented schematically by switch 100. Switch 100, which may be a microswitch for example, is shown as a S.P.D.T. switch, the blade or pole 100a of which is shown connected to ground. It will be assumed that pole 100a of switch 100 is normally in the position shown by the solid line. That is, the pole 100a of switch 100 is in contact with terminal 102a of gate 102. As will become apparent with the detailed description of FIG. 2, this condition produces a high level signal at an input of gate 102. Moreover, since terminal 104a is not connected to the pole of switch 100, a low level signal appears at an input of gate 104. The levels of the signals are, of course, relative and the magnitudes are not critical. In the preferred embodiment, the high level signal is ground or 0 volt and the low level signal is −3 volts.

Each of gates 102, 104 and 112 operates on the same principles. That is, these gates produce high level output signals only in response to low level input signals being applied to all of the input terminals thereof. Conversely, these gates produce low level output signals when one or more of the input signals applied thereto is a high level signal. For purposes of description, these gates may be termed NOR gates. However, by proper modification of signal levels and polarities other types of logic gates may be utilized. Thus, gate 102 must produce a low level output signal in view of the high level signal applied via terminal 102a. The output signal from gate 104 cannot be ascertained without further information which will be determined.

Since gate 102 must, in any event, produce a low level output signal, the low level signal is applied to pulseformer flip-flop 106. Pulseformer flip-flop 106 has the characteristic that when a low level signal is applied to input terminal 106a the output signals produced at terminals 106b and 106c are high and low level signals, respectively. Conversely, when a high level signal is applied to input terminal 106a of pulseformer flip-flop 106, the output signals at terminals 106b and 106c are low and high level signals, respectively. Moreover, the flip-flop has the property that its output signals can be changed only when clock pulses are applied thereto. Further discussion of the operation of pulseformer 106 will be presented subsequently.

In view of the low level signal applied at terminal 106a, a high level output signal is produced at output terminal 106b and a low level signal is produced at output terminal 106c when clock pulses are supplied to the flip-flop. The low level signal is applied to terminal 104b of gate 104. In view of the fact that gate 104 has applied thereto two (all) low level input signals, the output signal supplied thereby must be a high level signal. This high level signal is then applied to terminal 102b of gate 102. It will be seen that gate 102 continues to produce a low level signal as described previously. Therefore, so long as switch 100 remains in this condition, the signal levels described continue to exist.

Still assuming the steady state condition of switch 100, the high level output signal at terminal 106b is fed to delay line 108. This delay line is described as a long delay line. More particularly, this long delay line will insert approximately 0.7 microsecond delay in the passage of a signal from terminal 106b. The delayed signal from delay line 108 is applied to inverter gate 110 at a time 0.7 microsecond after the application of a clock pulse to the flip-flop. Thus, the high level signal which passed through delay line 108 is applied to gate 112 as a low level input signal.

The low level output signal supplied by flip-flop 106 at terminal 106c is supplied to delay line 114. This delay line is described as a short delay line. The delay of a signal passing therethrough is approximately 0.3 microsecond. Thus, the low level signal which passed through delay line 114 is applied to inverter gate 116 at a time 0.3 microsecond after the clock pulse. Due to the inverting characteristics of gate 116, the low level signal which passes through delay line 116 is applied to gate 112 as a high level signal.

In the alternative, inverter gates 110 and 116 may both be eliminated in accordance with the logic being utilized and the polarities desired for the output signals. The elimination of these gates provides a cost reduction in the production of the circuit. It should be noted that in the event that one of these gates (i.e. gates 110 and 116) are utilized, the other gate should also be utilized. Moreover, it should be explained that the delay lines should be reversed if the inverter gates are eliminated. Basically, the rule should be that the longer delay line should produce the low level signal applied to gate 112 while the switch 100 is as shown by the solid line. The circuit, as shown in FIG. 1, which incorporates both gates 110 and 116 is a preferred embodiment.

In view of the fact that gate 112 has applied thereto at least one high level input signal, the output signal produced thereby is clearly a low level signal. The low level signal from gate 112 is then applied to pulseformer flip-flop 118 which is identical to pulseformer flip-flop 106 in its operation. Therefore, at the application of clock pulses to flip-flop 118, the output signal at terminal 118b is a high level signal and the output signal at terminal 118c is a low level signal in view of the application of a low level signal to terminal 118a. Thus, the steady state operation of the circuit has been described for one condition of switch 100.

Still referring to FIG. 1, another steady state condition may also exist with switch 100 in the position shown by the dashed line. That is, the pole or blade 100a of switch 100 is in contact with input terminal 104a of gate 104. Consequently, a high level input signal is applied to gate 104 via terminal 104a. Moreover, the signal applied to gate 102 via terminal 102a is a low level signal.

In view of the high level input signal which is applied to gate 104, the output signal produced by gate 104 is a low level signal. The output signal of gate 104 is then applied to gate 102 via input terminal 102b. Clearly, the two input signals applied to gate 102 are low level signals. This condition causes gate 102 to produce a high level output signal.

The high level output signal from gate 102 is applied to input terminal 106a of pulseformer flip-flop 106. The application of a high level input signal reverses the flip-flop condition. That is, the polarities of the output signals from the pulseformer are reversed relative to those previously described as being produced in response to a low level input signal. Thus, with the application of clock pulses, the ouput signal produced at terminal 106b is a low level output signal and the output signal produced at terminal 106c is a high level output signal. It will be seen that the high level output signal at terminal 106c is fed back to gate 104 via input terminal 104b. This high level signal assures that the output signal from gate 104 will be a low level signal. Thus, so long as switch 100 is in the position shown by the dashed line, the signals as described for this condition continue to exist.

Similar to the previous description of the circuit with switch 100 in the position shown by the solid line, the output signals from pulseformer flip-flop 106 pass through the delay lines, etc. In particular, the low level output signal at terminal 106b is fed through long delay line 108, is inverted by inverter gate 110 and is applied as a high level input signal to gate 112. Also, the high level output signal terminal 106c passes through short delay line 114, is inverted by inverter gate 116 and is applied as a low level signal to gate 112. Gate 112 produces, as before, a low level output signal in accordance with the application of the high level input signal. This low level signal again causes pulseformer flip-flop 118 to produce a high level output signal at terminal 118b and a low level output signal at terminal 118c when clock pulses are applied thereto.

The operation of the circuit in either of the steady state conditions is described, supra. That is, the signal polarities are those described and the timing of the signals is controlled by clock pulses which are applied to the pulseformer flip-flops as will be described in detail subsequently. However, the important function of the circuit is to cause synchronization of pulses supplied by a source represented by switch 100. Clearly, since the input signals may be applied via a push-button switch at a time desired by the operator, these input signals are more often than not either asynchronous or nonsynchronous with respect to the remainder of the computer system. The task of assuring that these signals are supplied to the output device 120 in synchronism is performed by this circuit.

In addition, since the switch 100 will generally have contact-bounce due to the spring characteristic of the pole 100a of the switch, or due to faulty switch operation by the operator, improper transient signals may be inserted into the circuit when the switch is operated. That is, when it is desired to change the switch position to that shown by the dashed line, the pushbutton will be depressed or released as the case may be. Thus, the pole 100a will move away from contact 102a thereby producing a low level signal at terminal 102a before contact with terminal 104a is established.

In addition, pole 100a will often rebound from the initial contact with terminal 104a (without again contacting terminal 102a) thereby effectively producing a low level signal at that point. (In actuality, the pole 100a may rebound more than once.) The pole 100a will thereafter settle in "permanent" contact with terminal 104a thereby re-establishing the high level signal at this terminal. This circuit will also operate to eliminate the effect of these improper or spurious signals and to provide only a single 0.5 microsecond output pulse for each proper input signal.

Thus, if a short-term high level signal is applied to terminal 104a, gate 104 produces a low level output signal. This low level output signal is applied to gate 102 via terminal 102b. Since both inputs at gate 102 have applied thereto low level input signals, the output signal produced thereby is a high level signal. In the event that the high level signal applied to terminal 106a, which signal is directly related to the short term signal at terminal 104a, does not occur during the application of a clock pulse to pulseformer flip-flop 106, the flip-flop is not reset. However, with the application of a clock pulse to the flip-flop coincidentally with the signal applied to terminal 106a, this signal may set or reset the flip-flop in accordance with the polarity of the input signal. That is, as previously described a high level input signal at 106a resets the flip-flop and produces a high level signal at terminal 106c. Likewise, a low level signal at terminal 106a sets the flip-flop and produces a high level signal at terminal 106b. Moreover, the operation of pulseformer 106 is dependent upon the magnitude of the current which passes through the flip-flop during the clock pulse time. In the event that only a small current passes through the flip-flop during the clock pulse time, the flip-flop will not be completely reset. If a sufficient magnitude of current passes through the flip-flop during the clock pulse time, the flip-flop will be reset.

If it is assumed that the signal applied to the flip-flop during a clock pulse is very small, or if the signal does not occur during a clock pulse, it will be obvious that the signal at the output 120 will not change since flip-flop 106 will not be changed. However, it is equally clear that the application of a large signal to flip-flop 106 coincidentally with a clock pulse, will produce an output signal. That is, prior to the resetting signal, the signals at terminals 106*b* and 106*c* are high and low level signals respectively (see prior description). At the resetting signal, the signals at terminals 106*b* and 106*c* are low and high level signals. These signals are passed through delay lines 108 and 114 respectively. As previously noted, these delay lines have different delay periods. Therefore, the high level signal now supplied by terminal 106*c* is applied as a low level signal to gate 112 (via inverter gate 116) 0.3 microsecond after the resetting (clock) pulse. Since delay line 108 inserts a 0.7 microsecond delay into the circuit, the preceding low level signal (inverted high level signal from terminal 106*b*) from the set condition is still applied to gate 112 via inverter gate 120. The coincident application of low level signals at the inputs of gate 112 produces a high level output signal therefrom. Moreover, since the delay is 0.7 microsecond long, it is obvious that the high level output signal supplied to terminal 118*a* by gate 112 will exist when the next clock pulse is supplied to flip-flop 118, at a time 0.5 microsecond after the reset clock pulse at flip-flop 106. The application of this high level signal at terminal 118*c* resets flip-flop 118 and produces low and high level signals at terminals 118*b* and 118*c*, respectively. Moreover, by the time the next clock pulse is applied to flip-flop 118, the signal produced by gate 112 has become a low level signal since a high level signal is applied to the gate by inverter 110. Therefore, the output signal of flip-flop 118 is a pulse having a duration of 0.5 microsecond.

Figure 2:
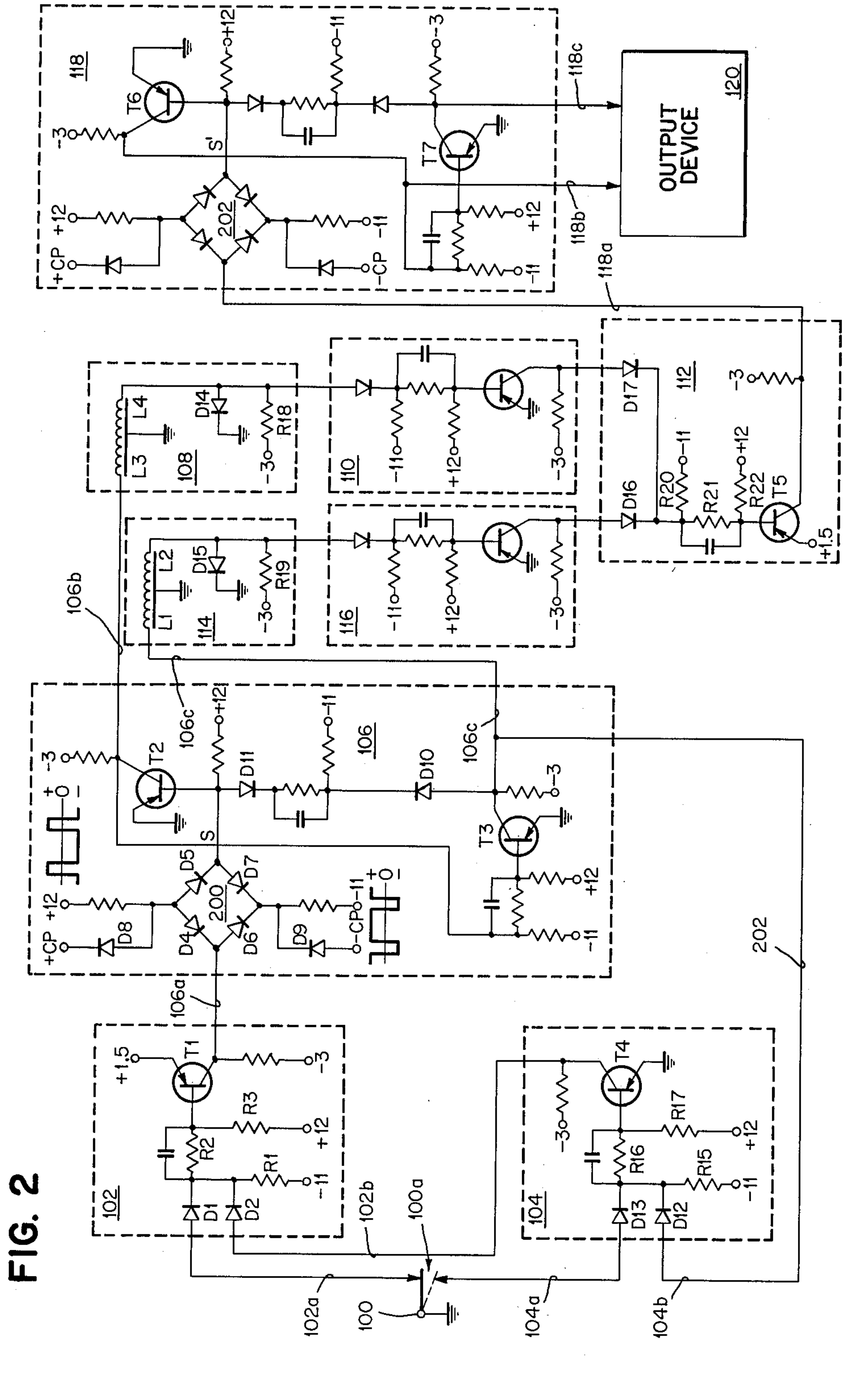
FIGURE 2 is a detailed schematic diagram of the circuit.

In FIG. 2, a detailed description of one preferred embodiment of the circuit is presented. Elements which are similar to those in FIG. 1, are designated by similar reference numerals. In addition, the specific circuits of the several logic blocks of FIG. 1 are shown inclosed by dashed lines. The operation of the specific logic circuits is generally known. Therefore, a detailed description of each is not deemed warranted. Thus, for example, pole 100*a* of switch 100 is (as shown in FIG. 1) connected to terminal 102*a* of gate 102. Terminal 102*a* may be represented by the anode of diode D1. This diode, as well as the others in the circuit, are made by Clevite Corp., for example, and incorporate low forward resistance and high speed characteristics. The cathode of diode D1 is coupled, along with the cathode of diode D2 to a tap in a voltage divider network. This voltage divider network comprises resistors R1, R2 and R3 connected between a negative voltage source (at R1) and a positive voltage source (at R3). The diodes D1 and D2, connected to the junction of resistors R1 and R2 of the voltage divider network R1, R2 and R3 form a logical OR gate for high level signals. It should be noted that more than two diodes (up to 13) may be connected in the gate. However, only two are used in this circuit. The OR gate is connected to transistor T1 which, like the other transistors, may be a Philco SB100 surface barrier transistor. This type of transistor provides extremely fast switching, e.g. about 10 to 15 milli-microseconds per stage at relatively low voltage ratings. The voltage divider tap at the junction of resistors R2 and R3 is connected to the base electrode of transistor T1. Thus, if a high level input signal is applied at the anode of either one of diodes D1 and D2, transistor T1 is cut off. Conversely, if low level signals are applied at the anodes of each of diodes D1 and D2, transistor T1 is turned on.

The output of transistor T1 is fed to pulseformer flip-flop 106. In particular the collector of T1 is applied to one node of the bi-directional gate 200. Basically, the bi-directional gate consists of a positive AND gate (diodes D4 and D8) and a negative AND gate (diodes D6 and D9) whose function is to sample the output of gate 102 during the 0.1 microsecond period of the clock pulse. At all other times these gates are open circuits so that no change will take place at the output S at the junction of the isolating diodes D5 and D7. That is, in the absence of a clock pulse (CP), diodes D8 and D9 conduct. In addition, either diode D6 or diode D4 will conduct depending upon the conduction or not of transistor T1. When a clock pulse is applied, diodes D8 and D9 are cut off and either diode pair D5 and D6 or D4 and D7 conducts according to the conduction state of T1. Thus, if the output of the gate 102 is positive (all low level input signals) at the time of a clock pulse, the positive clock gate (D4, D8) must function to produce a high level output at S. Similarly, if the output produced by gate 102 is negative (one or more high level input signals) at the clock pulse time, the negative clock gate (D6, D9) must operate so that the output at S is a low level signal. The output S is applied to the base electrode of transistor T2.

Depending upon the level of the output signal at S, T2 may be biased to the conducting state or vice versa. The principle of operation of the transistorized flip-flop circuit, including the coupling networks, speed-up capacitors, input diode D10 and stabilizing diode D11, is essentially the same as that described previously for transistorized gate 102. Moreover, the circuit comprising transistors T2 and T3 operates as a typical flip-flop circuit. That is, when one or the other of the transistors T2 and T3 is conducting, the other of the transistors is not conducting. This condition effects the output signals at terminals 106*b* and 106*c*.

The output at terminal 106*c* is fed back to terminal 104*b* via feedback wire 202. Terminal 104*b* represents the anode of diode D12. Diodes D12 and D13, in conjunction with resistors R15, R16 and R17, form an OR gate portion of gate 104 which is substantially similar to gate 102. The operation of these OR gates is identical. The output of the OR gate is again applied to the base electrode of transistor T4 to determine the conduction state thereof. The collector electrode of T4 (the output of gate 104) is applied to input terminal 102*a* of gate 102. Clearly then, it may be seen that any signal produced by either gate 102 or gate 104 will be recirculated through the network, so long as the signal produced by either of these gates is applied to a bi-directional gate circuit 200 in coincidence with a clock pulse.

The signals produced by flip-flop 106 are applied to delay lines 108 and 114. In particular, output terminal 106*b* is connected to the long delay line 108 and output terminal 106*c* is connected to the short delay line 114. These delay line elements are used to delay signals for a predetermined time. Short delay line 114 is used to introduce a delay of less than the time duration between two adjacent clock pulses, i.e. 0.3 microsecond. The delay circuit is a fairly conventional delay circuit comprised of a broad band coaxial cable used as a delay element. The characteristic impedance of a typical coaxial cable is:

$$Z_0=(L_t/C)^{1/2}$$

and the delay time of the section is:

$$T_d=(L_tC)^{1/2}$$

where L and C are the distributed inductance and capacitance of a unit-length of the coaxial cable. With the present day components (i.e. coaxial cables) it is possible to provide the desired 0.3 and 0.7 microsecond delay periods. Moreover, the value of $Z_0$ may have values between 47 ohms to several thousand ohms. In this particular case $Z_0$ should be about 1300 ohms, since this is the input impedance of inverter gate 110. However, in the case of delay 108 the circuit components must be determined such that the delay period of element 108 is 0.7 microsecond. The value of $Z_0$ for the long delay is about 5000 ohms because of physical dimension considerations of the coaxial cable. In order to provide a proper impedance match, the proper resistor may be connected in parallel therewith.

The output from delay element 108 is fed into inverter gate 110. This inverter circuit is substantially similar to the circuit of gate 102. However, in view of the fact that only one input is applied thereto, the main function of this gate is to invert the polarity of the signal applied thereto whereby the output signal has the opposite polarity from the input signal. The output signal from delay element 114 is applied to the input of inverter gate 116. Gate 116 is similar to gate 110 both in configuration and in function. That is, gate 116 produces an output signal which is opposite in polarity from the input signal applied thereto. In addition, these inverter circuits provide termination circuits for the delay elements. The inverter gates may actually be omitted as suggested supra, or, in the alternative, further levels of logic may be inserted between the delay elements and gate 112.

The output signals produced by inverter gates 110 and 116 are then applied to gate 112. Gate 112 is substantially similar to gate 102 and is coupled to pulseformer flip-flop 118 in a similar manner. That is, the diodes D16 and D17 operate as an OR gate as described supra. Similarly, resistors R20, R21 and R22 provide the voltage divider network associated therewith. The base electrode of transistor T5 is connected to the junction between resistors R22 and R21. The collector electrode of transistor T5 is connected to one node of bi-directional gate 202 which operates similarly to previously described bi-directional gate 200. Another node of the diode bridge which comprises the bi-directional gate 202 is connected to the base electrode of transistor T6 in the pulseformer flip-flop 118 which is similar to pulseformer flip-flop 106.

Transistors T6 and T7 are coupled together to provide the transistorized flip-flop. The output signals provided at the collector electrodes of each of these transistors are controlled by the output at terminal S′ of bi-directional gate 202 (similar to gate 200 as described in conjunction with pulseformer 106). The output signals from pulseformer 118 (signals at the collector electrodes of transistors T6 and T7) are fed to the output device 120.

Figure 3:
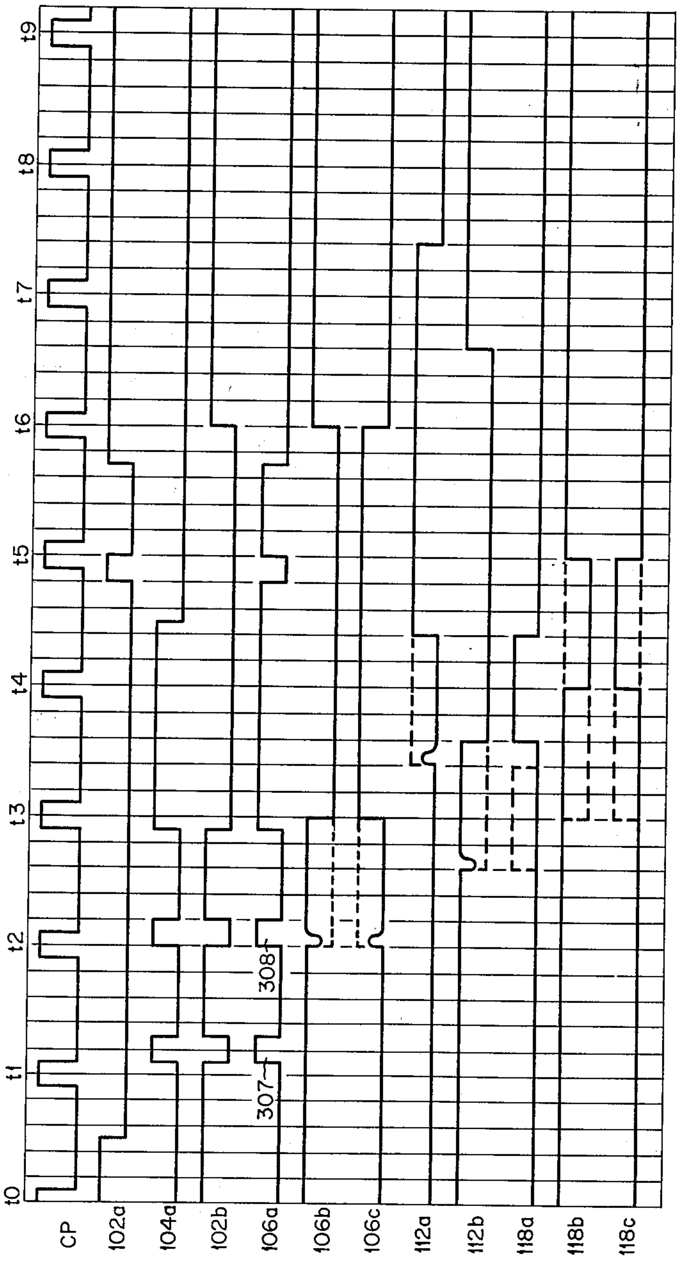
FIGURE 3 is a timing diagram for the circuit.

The operation of the circuit may best be understood by a description of the detailed schematic drawing of FIG. 2 in conjunction with the timing diagram of FIG. 3. That is, it will be assumed that initially switch 100 is in the position shown by the solid line in FIG. 2. Thus, terminal 102*a* has applied thereto a high level signal. As previously discussed, this causes gate 102 to produce a low level output signal at terminal 106*a*. The polarity of the remainder of the signals throughout the circuit can be ascertained by the description supra of either FIG. 1 or FIG. 2. In addition, these signal polarities are indicated in FIG. 3 at the clock pulse *t0*.

Between the clock pulses *t0* and *t1*, it will be assumed that switch 100 is pressed (or released) so that pole 100*a* assumes the position shown by the dashed line of either FIG. 1 or FIG. 2. In order to demonstrate the primary function of the circuit, it has been assumed that a certain finite time occurs between the removal of pole 100*a* from terminal 102*a* and the engagement of pole 100*a* and terminal 104*a*. In addition, it is assumed that the pole 100*a* exhibits a double contact bounce before it "permanently" engages terminal 104*a*. In particular, the disengagement of pole 100*a* and terminal 102*a* causes the signal level at terminal 102*a* to change from a high level signal to a low level signal. At the finite time thereafter (which for purposes of example is shown to be on the order of 0.3 microsecond) the signal at terminal 104*a* changes to a high level signal. However, this signal is a high level signal only so long as pole 100*a* is in contact with terminal 104*a*. When pole 100*a* rebounds from terminal 104*a*, the signal at the terminal returns to its low level. It will be seen, that the high level pulse does not coincide with a clock pulse. This condition is shown for purposes of complete explanation as will be described subsequently.

Some time after the initial contact of pole 100*a* and 104*a*, there is a second contact between these elements. Again, the time period between the contacts is exemplary only and the time period indicated is not required for proper operation of the circuit. In addition, it may be that there are less than or more than two short-term high level pulses due to contact bounce. However, it is believed that any contingency is explained by this example. The second pulse caused by the second contact of pole 100*a* and terminal 104*a* is again a positive going pulse. It will be noted that this pulse occurs partly coincidentally with the clock pulse *t2*. The effect of this partial coincidence will be described subsequently.

Finally, the pole 100*a* assumes "permanent" engagement with terminal 104*a*. This is shown as occurring substantially coincidentally with clock pulse *t3*. Moreover, this permanent contact is shown as existing through to a time between clock pulses *t4* and *t5*. It should be understood that this condition may exist for a much greater (or lesser) time but for purposes of explanation this pulse length is sufficient. The effect of the change of switch 100 which occurs between clock pulses *t4* and *t5* will be discussed subsequently with regard to the "release" of the switch.

At *t0*, the signal at terminal 102*b* is shown as a high level signal. When the signal at terminal 104*a* goes high, gate 104 produces a low level output signal. (This occurs each time gate 104 receives its high level input signal.) Therefore, there are low level signals at terminal 102*b* just after clock pulse *t1*, partially coincident with clock pulse *t2* and fully coincident wtih clock pulse *t3*.

Since the signal at terminal 102*a* remains low throughout this contact bouncing (it being assumed that pole 100*a* does not re-engage terminal 102*a*) the signal applied to terminal 106*a* of pulseformer flip-flop 106 by gate 102 substantially follows the signals applied at terminal 104*a*. That is, when a signal at terminal 104*a* goes high, gate 104 produces a low level output signal which is gated together with a low level signal at terminal 102*a* and produces a high level output signal at terminal 106*a*. Therefore, the signal applied to pulseformer flip-flop 106 is normally low except for the pulses immediately after clock pulse *t1*, partially coincident with clock pulse *t2* and fully coincident with clock pulse *t3* when they become high level pulses. It will be seen in the diagram that the pulses at 104*a* and 106*a* are similar.

The output pulses produced at terminals 106*b* and 106*c*, are, of course, dependent upon the signals applied at terminal 106*a* and the clock pulses. As previously discussed, the flip-flop 106 may be reset only when a resetting pulse occurs coincidentally with a clock pulse. Therefore, it will be seen that since pulse 307 is not applied to terminal 106*a* in coincidence with clock pulse *t1*, flip-flop 106 is not reset and the signals at terminals 106*b* and 106*c* remain in the same condition. If the pulse 308 (partially coincident with clock pulse *t2*) produces sufficient current flow through the bi-directional gate during the clock pulse, transistor T2 may be reset. That is, a criterion to be investigated is whether a signal at terminal S is of sufficient magnitude to switch transistor T2.

For purposes of discussion it will be assumed that pulse 308 does not produce sufficient current to switch transistor T2. Therefore, the signals at 106*b* and 106*c* will not be changed. For purposes of completeness, however, the alternative is discussed. That is, if pulse 308 provides sufficient current to switch transistor T2, pulses would be produced at terminals 106*b* and 106*c* as shown by the dashed lines. In view of the fact that even if the signal at terminal S is insufficient to switch the transistors T2 and T3, the transistors will attempt to switch and the small signal indicated will, in fact, be produced. However, since transistors T2 and T3 are not fully switched during the clock pulse *t2*, they return to the previous signal levels.

Proceeding to clock pulse *t3*, it will be seen that the pulse on 106a is fully coincident with the clock pulse. Therefore, because of the circuit parameters, sufficient current passes through bi-directional gate 200 during the clock pulse whereby the conduction state of transistors T2 and T3 is, in fact, changed. This causes the output signals at terminals 106b and 106c to reverse polarity. That is, the signal at 106b changes from a high level signal to a low level signal and the signal at 106c changes from a low level signal to a high level signal.

The output signals at terminals 106b and 106c are now fed through delay lines 108 and 114 respectively. In addition they are fed through the inverter gates 110 and 116 which are respectively associated with each of the delay lines. Therefore, the high signal at terminal 106c is applied to terminal 112b as a low level signal 0.3 microsecond after clock pulse *t3* where the time period is computed from the middle of the clock pulse shown. Similarly, the low level signal at terminal 106b is applied to terminal 112a as a high level signal 0.7 microsecond after clock pulse *t3*. The small pulses produced at terminal 112b between *t2* and *t3* and at terminal 112a between *t3* and *t4* are inconsequential since they do not occur during a clock pulse. The dashed lines indicate the appearance of the signals at terminals 112a and 112b if pulse 308 had actually been sufficient to reset flip-flop 106 as discussed supra.

Looking now at gate 112 it will be seen that up to and including clock pulse *t3* the input signals applied thereto had included a high level signal and a low level signal (signals 112b and 112a, respectively). As discussed previously the application of one or more high level signals to a gate similar to gate 112 causes the gate to produce a low level output signal. This signal is shown on line 118a in FIG. 3. However, between the clock pulses *t3* and *t4*, the signal at terminal 112b changes to a low level signal in response to the resetting of flip-flop 106. In addition, the signal at terminal 112a remains low because of the extended delay period of delay element 108, so that gate 112 has applied thereto, all low level input signals. Clearly, this condition causes gate 112 to produce a high level output signal.

In view of the design of the delay lines, it will be seen that the high level output signal produced at terminal 118a by gate 112 extends for 0.4 microsecond (i.e., 0.7–0.3 microsecond) and is fully coincident with the clock pulse *t4*. Thus, a high level input signal is applied to flip-flop 118 coincident with a clock pulse. Therefore, flip-flop 118 will be reset by the high level input signal at terminal 118a.

Returning to the signal at terminal 112a it will be seen that at a time which is 0.7 microsecond after clock pulse *t3* (viz., between clock pulses *t4* and *t5*) the signal at terminal 112a changes from a low level signal to a high level signal. This returns the input signals at gate 112 to a high and a low level signal whereby gate 112 produces a low level output signal at terminal 118a. Therefore, with the application of the next clock pulse (*t5*), a low level input signal is applied at terminal 118a. This causes flip-flop 118 to resume its set condition whereby the signal at terminal 118b is a high level signal and the signal at terminal 118c is a low level signal. Thus, the signal applied to output device exists only between clock pulses *t4* and *t5*.

Clearly, a review of the timing diagram will indicate that a single 0.5 microsecond output pulse is produced in synchronism with the clock pulses of the system. Moreover, this synchronized output pulse is produced in response to an asynchronous input pulse. Furthermore, it will be seen that although spurious pulses are produced due to mechanical limitations of the switch 100, these spurious signals have been eliminated and a single correct pulse is produced. This condition may be further evidenced by assuming that the pulses shown by dashed lines occur in response to pulse 308. It will be seen that even in this case only a single synchronized pulse is produced by the circuit.

A further advantage is shown in that the release of the switch 100 (whereby the circuit assumes its original configuration), as shown between clock pulses *t4* and *t5* for example, does not produce a spurious output pulse. That this is the case may easily be seen by a review of the signals on lines 102a through to 118a. Here the operation is similar with the exception that now instead of supplying two low level signals to gate 112 at a particular time (viz., the 0.4 microsecond between signals), the delay lines provide two high level signals at this time. Moreover, at all other times at least one high level signal is provided to gate 112 whereby a low level input signal is always applied at flip-flop 118. Clearly, since no resetting pulse is applied to flip-flop 118, there can be no coincidence between resetting signals and clock pulses and flip-flop 118 cannot be reset.

In summary then, a single output pulse is produced in synchronism with the clock pulses of the system in response to an asynchronous input pulse. Moreover, spurious pulses produced by the input mechanism are eliminated and a single correct pulse is produced.

Having thus described the invention what is claimed is:

1. A synchronizing circuit comprising a switchable source, first and second NOR-logic gates coupled to said switchable source such that only one of said gates is connected to said source at any time, means coupling the output of said second gate to an input of said first gate, a first flip-flop, means coupling the output of said first gate to said first flip-flop, feedback means coupling one output of said first flip-flop to an input of said second gate whereby an input signal applied to either of said first and second gates by said switchable source may be recirculated, first and second delay lines coupled to said first flip-flop, said delay lines having dissimilar delay periods, a second flip-flop, and means for gating together the outputs from said delay lines and applying the resultant signal to a second flip-flop.

2. A synchronizing circuit comprising first and second OR gates switchably coupled to an input source such that only one of said gates is connected to said source at any time, first and second inverting gates respectively connected to said first and second OR gates, means coupling the output of said second inverting gate to an input of said first OR gate, means coupling the output of said first inverting gate to a first flip-flop, means coupling one output of said flip-flop to an input of said second OR gate whereby an input signal applied to either of said first and second OR gates may be recirculated, first and second delay lines, means coupling each of said delay lines to a different output of said first flip-flop, said delay lines having dissimilar delay periods, a third OR gate for gating together the outputs from said delay lines, a second flip-flop, and a third inverting gate connected to said third OR gate for applying the resultant signal from said third OR gate to said second flip-flop.

3. A circuit for producing a single output pulse for each input signal, said circuit comprising first and second diode gating input circuits, first and second inverting transistors respectively coupled to the outputs of said first and second gating circuits, means for transmitting signals from said second inverting transistor to said first inverting transistor via said first input gating circuit, a first pair of transistors connected to form a flip-flop, a bidirectional diode gate for transmitting signals from said first inverting transistor to said first transistor flip-flop, feedback means for transmitting signals from said flip-flop to said second inverting transistor via said second input gating circuit, first and second delay lines having different delay periods, each of said delay lines coupled to a different output terminal of said first flip-flop, a third diode gating input circuit coupled to each of said delay lines for gating together the signals produced thereby, a third inverting transistor coupled to said third input gating circuit, a second pair of transistors connected to form a flip-flop, and a second bidirectional diode gate for transmitting signals from said third inverting transistor to said second transistor flip-flop.

4. A circuit for producing a single output pulse for each input signal, said circuit comprising first and second diode gates for gating together input signals, first and second inverting transistors respectively coupled to the output of said gating circuits, means for transmitting signals from said second inverting transistor to said first inverting transistor via said first diode gate, a first pair of transistors coupled together to form a flip-flop, a control pulse source, a bidirectional diode gate for transmitting signals from said first inverting transistor to said first transistor flip-flop only in response to the application of a pulse from said control pulse source, a feedback means for transmitting signals from said flip-flop to said second inverting transistor via said second diode gate, first and second delay lines having different delay periods, each of said delay lines coupled to a different output terminal of said flip-flop whereby the output signals from said first flip-flop are delayed for different time periods, a third diode gating circuit coupled to each of said delay lines for gating together the signals produced thereby, a third inverting transistor coupled to said third gating circuit, a second pair of transistors connected to form a flip-flop, and a second bidirectional diode gate for transmitting signals from said third inverting transistor to said second transistor flip-flop only in response to the application of a pulse from said control pulse source.

5. A synchronizing circuit comprising first and second logic gates adapted to be alternatively coupled to an input source such that only one of said gates is connected to said source at any time, means coupling the output of said second gate to an input of said first gate, first bidirectional diode gate means coupling the output of said first gate to a first transistorized flip-flop, means coupling an output terminal of said flip-flop to an input of said second gate whereby an input signal applied to either of said first and second gates may be recirculated, first and second delay lines coupled to different output terminals of said flip-flop, said delay lines having dissimilar delay periods, a third logic gate for gating together the outputs from said delay lines, and said bidirectional diode gate means coupling said third logic gate to a second transistorized flip-flop.

6. A synchronizer circuit comprising a first flip-flop network, a trigger circuit comprising a pair of gating circuits, the output of one of said gating circuits connected to an input of the other gating circuit, the output of the other gating circuit coupled to said first flip-flop to control the state thereof, different period delay lines coupled to the outputs of said first flip-flop network, further gating means for combining the two output signals from said delay lines and producing one signal representative thereof, and a second flip-flop coupled to said further gating means whereby the state of said flip-flop is controlled.

7. A circuit comprising, a pair of gates for receiving input signals, a separate transistor connected to each gate for amplifying the signal produced by each of said gates, one of said transistors connected to the input of the gate which feeds the other transistor, means for regularly supplying control pulses, a bridge circuit connected to said other transistor for alternatively passing signals in either direction when enabled by the application of a control pulse thereto from said control pulse supplying means, a first flip-flop connected to said bridge circuit, the conduction state of said first flip-flop being controlled by the signal passed by said bridge, a long period delay element connected to one output of said flip-flop, a short period delay element connected to another output of said flip-flop, said delay elements having the delay periods thereof measured relative to the time between the control pulses supplied by said control pulse supplying means, a third gate connected to both of said delay elements thereby to produce output signals in response to the signals passed by said delay elements, a further transistor connected to said third gate for amplifying the output signal produced thereby, a further bridge circuit connected to said further transistor for alternatively passing signals in either direction when enabled by the application of a control pulse thereto from said control pulse supplying means, and a second flip-flop connected to said further bridge circuit, the conduction state of said second flip-flop being controlled by the signal passed by said further bridge.

8. The combination as claimed in claim 6 wherein each of delay lines comprises a section of coaxial cable.

9. In combination, a pair of OR gates for receiving input signals, a separate transistor connected to each OR gate for amplifying the signal produced by each of said OR gates, one of said transistors connected to the input of the OR gate which feeds the other transistor, a flip-flop circuit, switching means coupled between said other transistor and said flip-flop circuit, said switching means being adapted for alternatively passing signals in either direction when enabled by the application of a control pulse, the conduction state of said flip-flop being controlled by the direction of the signals passed by said switching means, a long period delay element connected to one output of said flip-flop, a short period delay element connected to another output of said flip-flop, a further OR gate connected to both of said delay elements thereby to produce output signals in response to the signals passed by said delay elements, a further transistor connected to said further OR gate for amplifying the output signal produced thereby, a further flip-flop circuit, and further switching means coupled between said further transistor and said further flip-flop circuit, said further switching means being adapted for alternatively passing signals in either direction when enabled by the application of a control pulse, the conduction state of said further flip-flop being controlled by the direction of the signals passed by said further switching means.

10. A pulseformer circuit comprising, a pair of gates for receiving input signals, a separate transistor connected to each gate for amplifying the signal produced by each of said gates, one of said transistors connected to the input of the gate which is connected to the other transistor, a bridge circuit connected to said other transistor, means for supplying control pulses, said bridge circuit being adapted for passing a signal from said other transistor only when enabled by the application of a control pulse thereto by said control pulse supplying means, a flip-flop connected to said bridge circuit such that the state of said flip-flop is controlled by the signal passed by said bridge and is not affected by spurious pulses which are non-synchronous with said control pulse, means connecting one output of said flip-flop to the gate which is connected to said one transistor, a first delay element connected to one output of said flip-flop and having a delay period greater than the time period between adjacent control pulses, a second delay element connected to another output of said flip-flop and having a delay period of less than the time period between adjacent control pulses, a further gate connected to both of said delay elements thereby to produce output signals in response to the signals passed by said delay elements, said further gate producing a first signal at all times except during the time period represented by the difference in delay element periods when the signals passed by said delay elements are similar and which follows a change in the state of said flip-flop at which time said gate may produce a second signal, a further transistor connected to said further gate for amplifying the output signal produced by said further gate, a further bridge circuit connected to said further transistor, said further bridge circuit being adapted for passing a signal from said further transistor only when enabled by the application of said control pulse thereto by said control pulse supplying means, and a further flip-flop connected to said further bridge circuit such that the state of said flip-flop is controlled by the signal passed by said further bridge, said further flip-flop being adapted to produce different outputs in accordance with the signals produced by said further gate.

11. A pulseformer circuit comprising a plurality of gates for receiving input signals, a separate transistor connected to each gate for amplifying the signal produced by each of said gates, a source of control pulses, a flip-flop circuit, control means connected between one of said transistors and said flip-flop and being adapted for passing a signal from said transistor only when enabled by the application of a control pulse thereto, the state of said flip-flop being controlled by the signal passed by said control means, means connecting the transistors which are not connected to said control means to an input of the gate connected to said one transistor, a first delay element connected to one output of said flip-flop and having a delay period greater than the time period between adjacent control pulses, a second delay element connected to another output of said flip-flop and having a delay period less than the time period between adjacent control pulses, means connecting one of said flip-flop outputs to the inputs of the gates which are connected to the transistors which are connected to the other gates, a further gate connected to both of said delay elements thereby to produce output signals in response to the signals passed by said delay elements, said further gate producing a first signal at all times except during the time period represented by the difference in delay element periods when the signals produced by said delay elements are identical and which follows a change in the state of said flip-flop at which time said gate may produce a second signal, a further transistor connected to said further gate for amplifying the output signal produced by said further gate, a further flip-flop circuit, and further control means connected between said further transistor and said further flip-flop circuit and being adapted for passing a signal from said further transistor only when enabled by the application of a control pulse, the state of said further flip-flop being controlled by the signal passed by said further control means, said further flip-flop being adapted to produce different outputs in accordance with the signals produced by said further gate.

12. The combination as called for in claim 9 including a control pulse supplying source, said source connected to each of said switching means and operable to supply control pulses thereto.

13. A synchronizing circuit comprising a switchable source, first and second inverting gate circuits coupled to said switchable source such that only one of said gates is connected to said source at any time, means coupling the output of said second gate circuit to an input of said first gate circuit, a first flip-flop, means coupling the output of said first gate circuit to said flip-flop, feedback means coupling one output of said first flip-flop to an input of said second circuit whereby a signal applied to either of said first and second circuits by said switchable source may be recirculated, first and second delay lines coupled to said first flip-flop, said delay lines having dissimilar delay periods, a second flip-flop, and means for gating together the outputs from said delay lines and applying the resultant signal to said second flip-flop.

14. A synchronizing circuit comprising first and second inverting gate circuits switchably coupled to an input source such that only one of said gates is connected to said source at any time, means coupling the output of said second gate to an input of said first gate, means coupling the output of said first gate to a first flip-flop, means coupling one output of said flip-flop to an input of said second gate whereby an input signal applied to either of said first and second gates may be recirculated, first and second delay lines, means coupling each of said delay lines to a different output of said first flip-flop, said delay lines having dissimilar delay periods, and means including at least a third inverting gate circuit for gating together the outputs from said delay lines and applying the resultant signal to a second flip-flop.

References Cited in the file of this patent

UNITED STATES PATENTS

| | | |
|---|---|---|
| 2,824,228 | Carmichael | Feb. 18, 1958 |
| 2,853,238 | Johnson | Sept. 23, 1958 |
| 2,971,157 | Harper | Feb. 7, 1961 |
| 2,973,507 | Grondin | Feb. 28, 1961 |
| 3,028,552 | Hahs | Apr. 3, 1962 |

OTHER REFERENCES

Static Switching Circuits, by Mathias, May 1957 of Control Engineering, pp. 80–83.

Handbook of Automation Computation and Control, edited by Grabbe, Ramo and Wooldridge, vol. 2, page 17–04, Table 3. Copyright 1959, John Wiley and Sons, Inc.